(12) United States Patent
Chavali

(10) Patent No.: US 7,233,593 B2
(45) Date of Patent: Jun. 19, 2007

(54) SYSTEM, DEVICE, AND METHOD FOR ROUTING INFORMATION IN A COMMUNICATION NETWORK USING POLICY EXTRAPOLATION

(75) Inventor: Srikanth Chavali, Nashua, NH (US)

(73) Assignee: Nortel Networks Limited (CA)

( * ) Notice: Subject to any disclaimer, the term of this patent is extended or adjusted under 35 U.S.C. 154(b) by 1000 days.

(21) Appl. No.: 10/192,113

(22) Filed: Jul. 10, 2002

(65) Prior Publication Data
US 2003/0169689 A1 Sep. 11, 2003

Related U.S. Application Data

(60) Provisional application No. 60/361,850, filed on Mar. 5, 2002.

(51) Int. Cl.
*H04L 12/28* (2006.01)
(52) U.S. Cl. .................... 370/392; 370/401
(58) Field of Classification Search ............. None
See application file for complete search history.

(56) References Cited

U.S. PATENT DOCUMENTS

| | | | |
|---|---|---|---|
| 7,028,092 B2* | 4/2006 | MeLampy et al. | 709/230 |
| 2002/0141378 A1* | 10/2002 | Bays et al. | 370/351 |
| 2002/0184393 A1* | 12/2002 | Leddy et al. | 709/250 |
| 2003/0014540 A1* | 1/2003 | Sultan et al. | 709/240 |
| 2003/0149787 A1* | 8/2003 | Mangan | 709/238 |

OTHER PUBLICATIONS

Rekhter, et al. A Border Gateway Protocol 4 (BGP-4), Internet Engineering Task Force (IETF), Request for Comments (RFC) 1771, Mar. 1995.
Chandra, et al. BGP Communities Attribute, Internet Engineering Task Force (IETF), Request for Comments (RFC) 1997, Aug. 1996.

* cited by examiner

*Primary Examiner*—Duc Ho
(74) *Attorney, Agent, or Firm*—McGuinness & Manaras LLP

(57) ABSTRACT

Communities attributes are inserted into a packet in a predetermined sequence. A receiving device extrapolates policy information from the sequence of communities attributes for making intelligent routing decisions.

13 Claims, 6 Drawing Sheets

SYSTEM, DEVICE, AND METHOD FOR ROUTING INFORMATION IN A COMMUNICATION NETWORK USING POLICY EXTRAPOLATION

PRIORITY

The present application claims priority from the U.S. Provisional Patent Application No. 60/361,850 filed on Mar. 5, 2002 in the name of Srikanth Chavali, which is hereby incorporated herein by reference in its entirety.

FIELD OF THE INVENTION

The present invention relates generally to communication networking, and more particularly to routing information in a communication network using policy extrapolation for making intelligent routing decisions.

BACKGROUND OF THE INVENTION

In today's information age, communication networks carry vast amounts of information. Communication networks typically include various types of networking devices, such as routers and switches, that send and receive information based upon various types of routing information. The routing information is computed by the networking devices based upon various routing protocols.

A large communication network typically includes a number of sub-networks that operate somewhat independently of one another. For convenience, such a sub-network is often referred to as an autonomous system (AS). Networking devices within an AS compute internal routes based upon an internal routing protocol. Network devices at the border of each AS compute external routes based upon an external routing protocol. One such external routing protocol is commonly known as the Border Gateway Protocol (BGP). BGP is described in Rekhter et al., A Border Gateway Protocol 4 (BGP-4), Internet Engineering Task Force (IETF) Request For Comments (RFC) 1771, March 1995, which is hereby incorporated herein by reference in its entirety. A border device of an AS using BGP is often referred to as a BGP speaker.

Within BGP, a group of destinations that share some common property is referred to as a community. Each AS administrator may define the community or communities to which a particular destination belongs. A BGP speaker may use community information to control which routing information it accepts, prefers, or distributes to other neighboring border devices.

Community information may be carried within BGP packets, specifically within one or more BGP community attributes in a BGP packet. BGP community attributes are described in Chandra et al., BGP Communities Attribute, Internet Engineering Task Force (IETF) Request For Comments (RFC) 1997, August 1996, which is hereby incorporated herein by reference in its entirety. Aside from certain reserved values, a BGP communities attribute is a 32-bit value that is encoded using an AS number in the first two octets and an attribute value in the second two octets. Attribute values can be defined by the AS, and therefore the same attribute value can mean two different things in two different autonomous systems. The use of BGP communities attributes is optional. A BGP speaker can insert, modify, or replace a BGP community attribute in a BGP packet. When BGP communities attributes are used, there is no specified mechanism for placing the BGP communities attributes in the BGP packet. For example, the BGP communities attributes can be inserted, modified, or replaced differently by each BGP speaker, and multiple BGP communities attributes are not placed in the BGP packet in any particular location or order. A border device that receives a BGP packet with one or more BGP communities attributes can use the community information to make certain routing decisions.

SUMMARY OF THE INVENTION

In accordance with one aspect of the invention, communities attributes are inserted into a packet in a predetermined sequence. A receiving device extrapolates policy information from the sequence of communities attributes for making intelligent routing decisions.

In accordance with another aspect of the invention, a method for routing information in a communication network involves inserting a sequence of policy attributes into a communication message and extrapolating policy information from the sequence of policy attributes by a receiving device in the communication network. The communication message may be a Border Gateway Protocol (BGP) packet, and the policy attributes may be BGP communities attributes. Each BGP communities attribute includes an autonomous system identifier and an attribute value. Inserting a sequence of policy attributes into a communication message typically involves appending a policy attribute to at least one existing policy attribute in the communication message. Extrapolating policy information from the sequence of policy attributes by a receiving device in the communication network typically involves formulating policy and routing decisions based upon a plurality of policy attributes.

In accordance with another aspect of the invention, an apparatus includes logic for receiving a communication message including at least one policy attribute and logic for inserting a policy attribute into the communication message in a predetermined sequence. The communication message may be a Border Gateway Protocol (BGP) packet, and the policy attributes may be BGP communities attributes. Each BGP communities attribute includes an autonomous system identifier and an attribute value. The logic for inserting a policy attribute into the communication message in a predetermined sequence typically includes logic for appending the policy attribute to at least one existing policy attribute in the communication message.

In accordance with another aspect of the invention, an apparatus includes logic for receiving a communication message including a plurality of policy attributes in a predetermined sequence and logic for extrapolating policy information from the sequence of policy attributes. The communication message may be a Border Gateway Protocol (BGP) packet, and the policy attributes may be BGP communities attributes. Each BGP communities attribute includes an autonomous system identifier and an attribute value. The logic for extrapolating policy information from the sequence of policy attributes typically includes logic for formulating policy and routing decisions based upon a plurality of policy attributes.

In accordance with another aspect of the invention, a system includes a plurality of communication devices, wherein each of a number of communication devices is operably coupled to insert a policy attribute into a communication message in a predetermined sequence, and wherein a receiving device is operably coupled to extrapolate policy information from the sequence of policy attributes. The communication message may be a Border Gateway Protocol (BGP) packet, and the policy attributes may be BGP communities attributes. Each BGP communities attribute includes an autonomous system identifier and an attribute value.

DETAILED DESCRIPTION OF A PREFERRED EMBODIMENT

In an embodiment of the present invention, BGP speakers insert BGP communities attributes into the BGP packet in a predetermined sequence as the routes get advertised in the networks. BGP speakers do not modify or replace existing BGP communities attributes in the BGP packet, but rather append a new BGP communities attribute to any existing BGP communities attributes in a predetermined sequence. In this way, the BGP packet carries the BGP communities attributes from a number of successive BGP speakers in an orderly fashion. A receiving device extrapolates policy information from the sequence of BGP communities attributes for making intelligent routing decisions.

Figure 1:
FIG. 1 shows the format of a BGP communities attribute.

FIG. 1 shows the format of a BGP communities attribute 100. The BGP communities attribute 100 is a 32-bit value that is encoded using an AS number 110 in the first two octets and an attribute value 120 in the second two octets.

Figure 2:
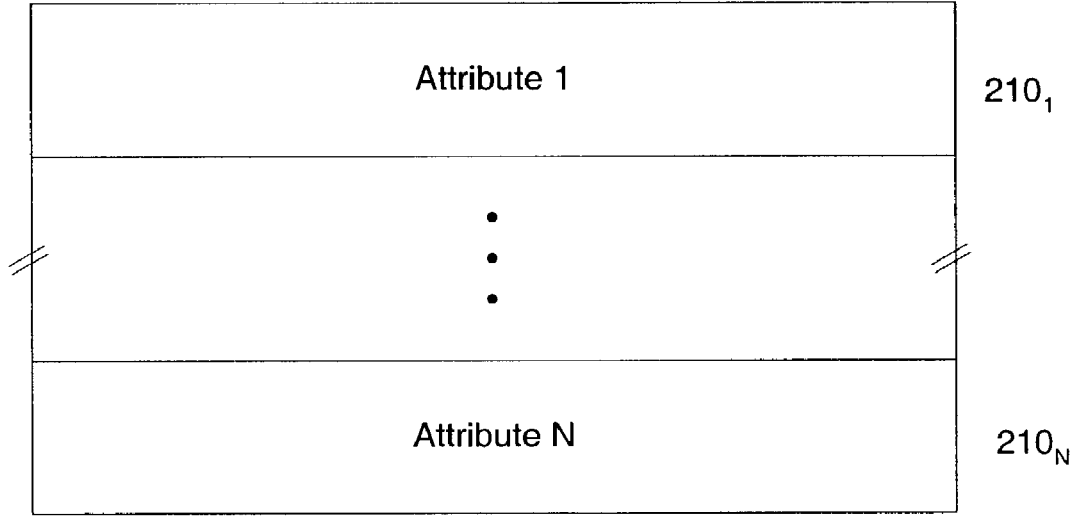
FIG. 2 shows a portion of a BGP packet including a sequence of BGP communities attributes in accordance with an embodiment of the present invention.

FIG. 2 shows a portion of a BGP packet 200 including a sequence of BGP communities attributes $210_1$–$210_N$. Each BGP communities attribute 210 is appended to any existing BGP communities attributes by each successive BGP speaker in a predetermined sequence.

When a border device receives a BGP packet including a sequence of BGP communities attributes, the border device can consider some or all of the entire chain of BGP communities attributes in making its routing decisions. For example, the border device can consider not only the BGP communities attributes associated with its neighboring AS, but also the BGP communities attributes associated with other autonomous systems accessible through the neighboring AS. The sequence of BGP communities attributes provides the border device with the sequence of autonomous systems to the destination, and also provides the border device with policy information from each AS for the destination. The border device can extrapolate policy information from the sequence of BGP communities attributes for making intelligent routing decisions.

Certain aspects of the present invention can be demonstrated by example.

Figure 3:
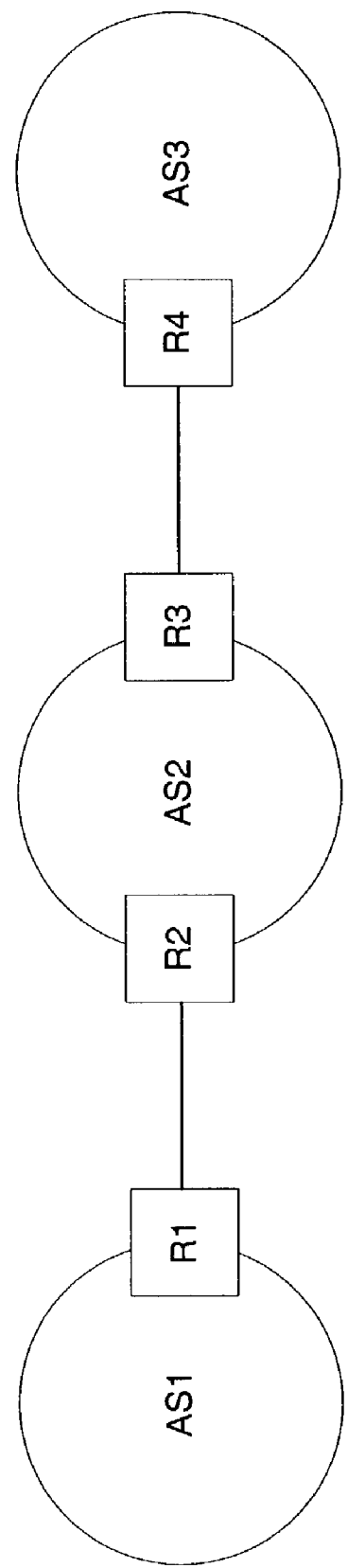
FIG. 3 shows an exemplary communication network having three autonomous systems.

FIG. 3 shows an exemplary communication network 300 having three autonomous systems, namely AS1, AS2, and AS3. Router R1 is on the border of AS1. Routers R2 and R3 are on the border of AS2. Router R4 is on the border of AS3. AS1 and AS2 are interconnected through routers R1 and R2. AS2 and AS3 are interconnected through routers R3 and R4. AS1 and AS3 have connectivity to other communication networks (not shown).

When AS1 learns about a low-priority destination that is reachable through AS1, the router R1 sends a BGP packet to router R2 including a BGP communities attribute including an AS number for AS1 and an attribute value indicating a low-priority destination. For convenience, this BGP communities attribute is notated "AS1:low-priority."

When router R3 advertises the route to router R4, it appends a BGP communities attribute including an AS number for AS2 an attribute value. One exemplary attribute value might indicate that the receiving AS should not advertise the route beyond the current AS. For convenience, this BGP communities attribute is notated "AS2:don't-advertise-beyond-current-AS."

Thus, the BGP packet received by router R4 includes two BGP communities attributes in sequence, specifically BGP communities attribute "AS2:don't-advertise-beyond-current-AS" followed by BGP communities attribute "AS1: low-priority."

From these two BGP communities attributes, AS3 can make two decisions regarding the route. First, AS3 will not further advertise the route because of the BGP communities attribute "AS2:don't advertise-beyond-current-AS." Second, AS3 understands that anyone trying to get to the destination through AS1 will not get priority over other routes.

It should be noted that there may be more autonomous systems between AS1 and AS3. Intervening routers in these autonomous systems should not change the BGP communities attributes in the BGP packet, but otherwise there are really not restrictions on how the packet needs to be handled by these intervening routers.

One use for considering the entire chain of BGP communities attributes is to override other routing decisions. For example, if there are two routes to a particular destination, the routing protocol will designate one of the routes as the preferred (best) route and the other as an alternate route. However, a border device can override these designations and use the alternate route rather than the best route based upon the community attribute of a non-neighboring AS.

Figure 4:
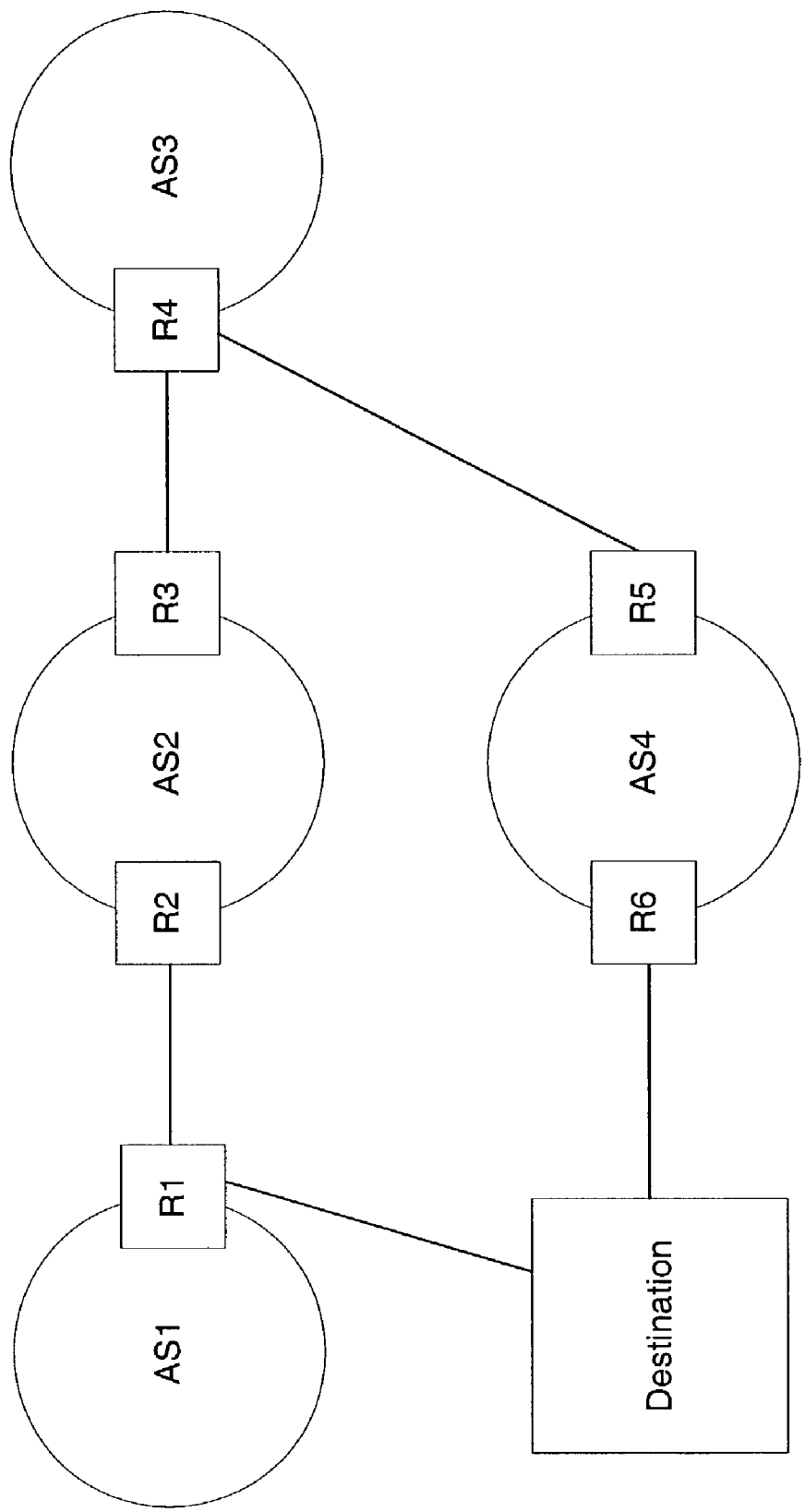
FIG. 4 shows an exemplary communication network having four autonomous systems.

FIG. 4 shows an exemplary communication network 400 having four autonomous systems, namely AS1, AS2, AS3, and AS4. Router R1 is on the border of AS1. Routers R2 and R3 are on the border of AS2. Router R4 is on the border of AS3. Routers R5 and R6 are on the border of AS4. AS1 and AS2 are interconnected through routers R1 and R2. AS2 and AS3 are interconnected through routers R3 and R4. AS3 and AS4 are interconnected through routers R4 and R5. The destination device can be reached through router R1 and R6.

In this example, a policy decision is made that routers outside of AS1 should not access the destination through router R1 unless there is no alternate route to the destination, even if the route through router R1 is the best route. This decision can be made for any of a number of reasons, including bandwidth issues. When advertising the destination, router R1 sends a BGP packet to router R2 including a BGP communities attribute including an AS number for AS1 and an attribute value indicating that routers outside of AS1 should not access the destination through router R1 unless there is no alternate route to the destination, even if the route through router R1 is the best route. For convenience, this BGP communities attribute is notated "AS1:use-another-route-if-possible."

When router R3 advertises the route to router R4, it appends a BGP communities attribute including an AS number for AS2 an attribute value. One exemplary attribute value might indicate that the receiving AS should not advertise the route beyond the current AS. For convenience, this BGP communities attribute is notated "AS2:don't-advertise-beyond-current-AS."

Thus, the BGP packet received by router R4 includes two BGP communities attributes in sequence, specifically BGP communities attribute "AS2: don't-advertise-beyond-current-AS" followed by BGP communities attribute "AS1:use-another-route-if-possible."

Router R4 also learns about the destination through routers R6 and R5.

In this example, it is assumed that router R4 determines that the best route to the destination is through router R3. However, because of the sequence of BGP communities attributes in the BGP packet received from router R3, router R4 knows that packets forwarded to the destination through router R3 will pass through AS1, which does not want to handle the traffic unless there is no other reachability for the traffic. Therefore, router R4 chooses to forward packets to the destination through router R5 even though this is not the best route according to the underlying routing protocol.

From these two BGP communities attributes, AS3 can make two decisions regarding the route. First, AS3 will not further advertise the route because of the BGP communities attribute "AS2:don't advertise-beyond-current-AS." Second, AS3 understands that anyone trying to get to the destination through AS1 will not get priority over other routes.

Figure 5:
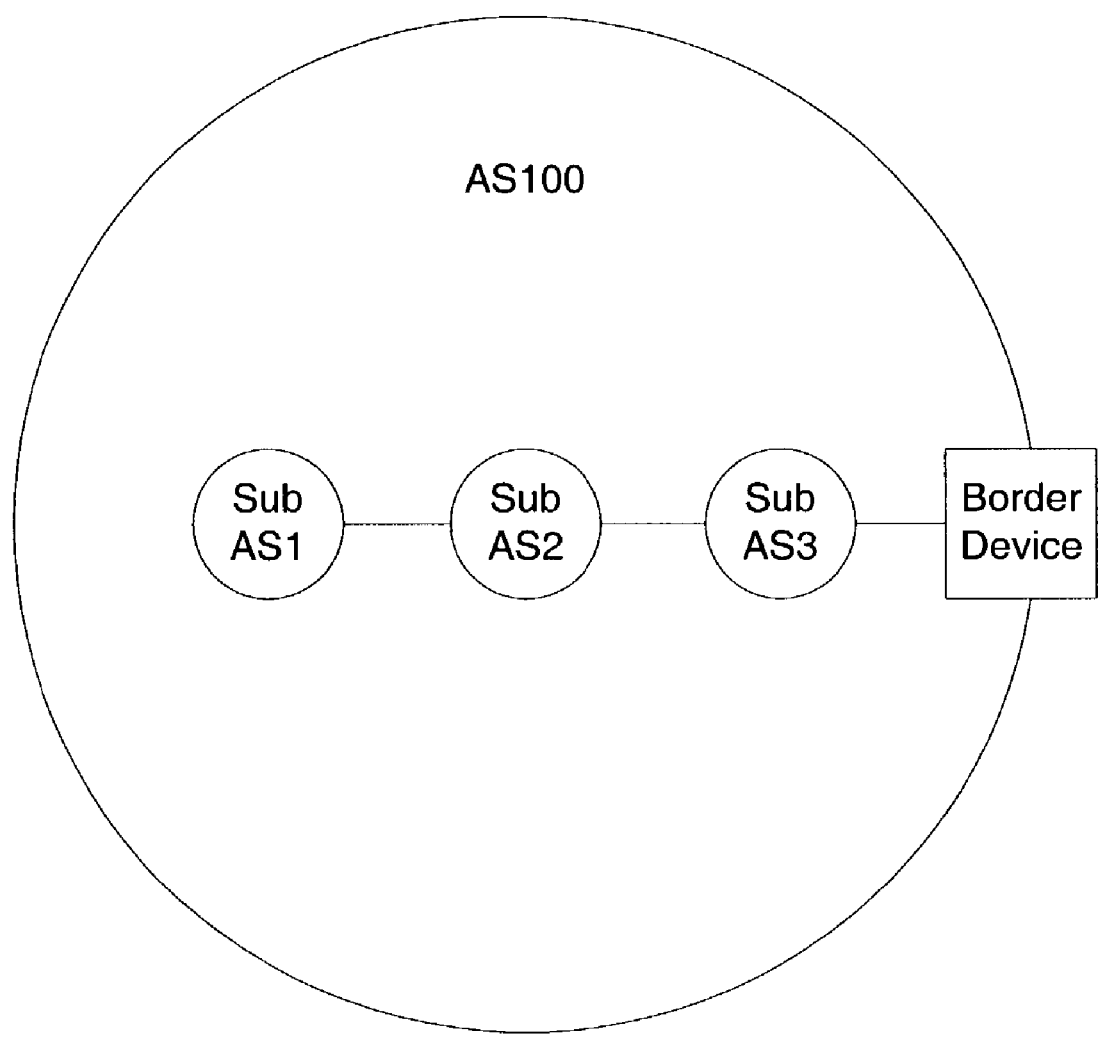
FIG. 5 shows a communication network including an autonomous system AS100 having a border device and three sub-autonomous systems.

FIG. 5 shows a communication network 500 including an autonomous system AS100 having a border device. Within AS100 are three sub-autonomous systems, namely SubAS1, SubAS2, and SubAS3. When a particular route gets advertised by the sub-autonomous systems in AS100, each sub-AS appends a BGP communities attribute as discussed above. Each sub-AS can use the sequence of BGP communities attributes to make intelligent routing decisions as described above.

When the route advertisement reaches the border device of AS100, the border device can use the BGP communities attributes to extrapolate the policy and replace it with its own policy. Specifically, when the border device receives the route advertisement with the sequence of BGP communities attributes, the border device makes a decision as to what policy to apply based upon the sequence of BGP communities attributes in the route advertisement that were appended by each sub-AS. It then replaces BGP communities attributes with its own BGP communities attributes based upon the extrapolation of the sequence of BGP communities attributes before advertising the route to an external AS.

Figure 6:
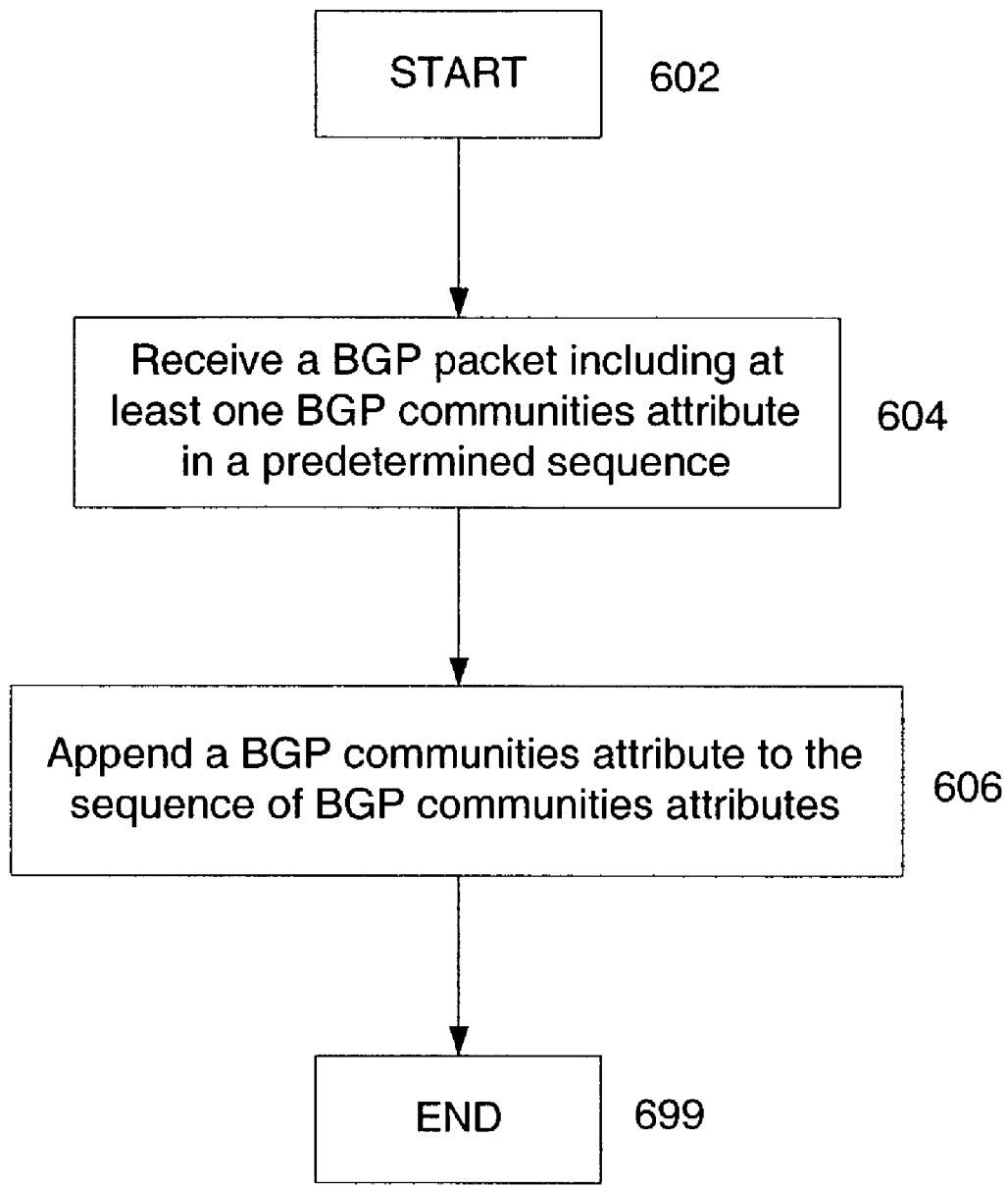
FIG. 6 is a logic flow diagram showing exemplary logic for appending a BGP communities attribute to a BGP packet in accordance with an embodiment of the present invention.

FIG. 6 is a logic flow diagram showing exemplary logic 600 for appending a BGP communities attribute to a BGP packet in accordance with an embodiment of the present invention. Beginning at block 602, the logic receives a BGP packet including at least one BGP communities attribute in a predetermined sequence, in block 604. The logic appends a BGP communities attribute to the sequence of BGP communities attributes, in block 606. The logic 600 terminates in block 699.

Figure 7:
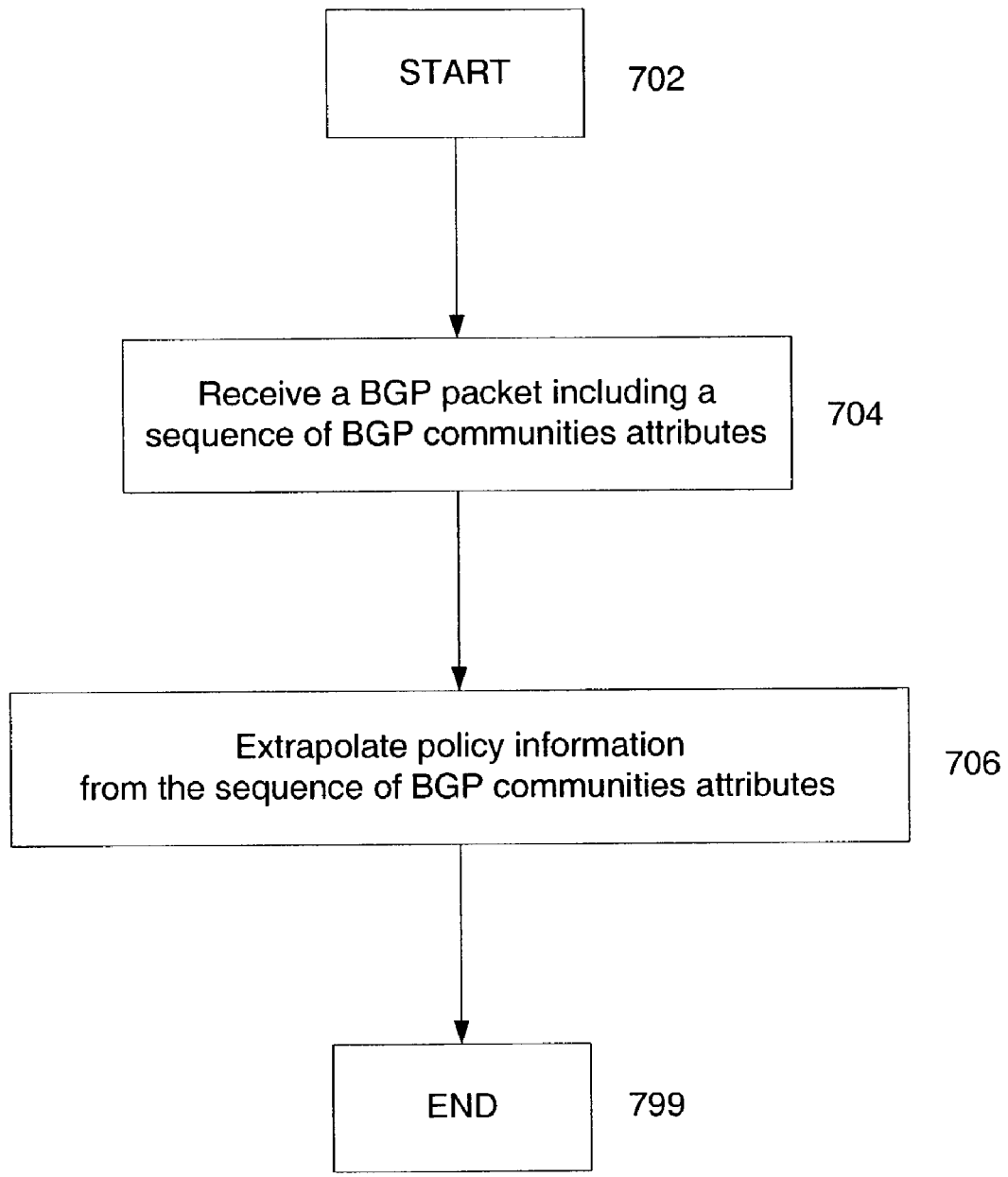
FIG. 7 is a logic flow diagram showing exemplary logic for extrapolating policy information based upon a sequence of BGP communities attributes in accordance with an embodiment of the present invention.

FIG. 7 is a logic flow diagram showing exemplary logic 700 for extrapolating policy information based upon a sequence of BGP communities attributes in accordance with an embodiment of the present invention. Beginning in block 702, the logic receives a BGP packet including a sequence of BGP communities attributes, in block 704. The logic extrapolates policy information from the sequence of BGP communities attributes, in block 706. The logic terminates in block 799.

It should be noted that the term "router" is used herein to describe a communication device that may be used in a communication system, and should not be construed to limit the present invention to any particular communication device type. Thus, a communication device may include, without limitation, a bridge, router, bridge-router (brouter), switch, node, or other communication device.

It should also be noted that the term "packet" is used herein to describe a communication message that may be used by a communication device (e.g., created, transmitted, received, stored, or processed by the communication device) or conveyed by a communication medium, and should not be construed to limit the present invention to any particular communication message type, communication message format, or communication protocol. Thus, a communication message may include, without limitation, a frame, packet, datagram, user datagram, cell, or other type of communication message.

It should also be noted that the logic flow diagrams are used herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

The present invention may be embodied in other specific forms without departing from the true scope of the invention. The described embodiments are to be considered in all respects only as illustrative and not restrictive.

What is claimed is:

1. A method for routing information in a communication network, the method comprising:
    inserting a sequence of policy attributes into a communication message in a predetermined sequence, with the sequence of policy attributes including at least two policy attributes, each of the at least two policy attributes in the sequence being inserted in order by one or more nodes in the communication network as the communication message traverses the communication network, the communication message comprising a Border Gateway Protocol (BGP) packet, and the policy attributes comprising BGP communities attributes;
    extrapolating policy information from the sequence of policy attributes by a receiving device in the communication network, including considering the order of the sequence of policy attributes when extrapolating policy information; and
    making routing decisions by the receiving device based upon the extrapolated policy information.

2. The method of claim 1, wherein each BGP communities attribute comprises: an autonomous system identifier; and an attribute value.

3. The method of claim 1, wherein inserting a sequence of policy attributes into a communication message comprises: appending a policy attribute to at least one existing policy attribute in the communication message.

4. The method of claim 1, wherein extrapolating policy information from the sequence of policy attributes by a receiving device in the communication network comprises: formulating a policy decision based upon a plurality of policy attributes.

5. The method of claim 1, wherein making routing decisions by the receiving device based upon the extrapolated policy information comprises: determining a route based upon the extrapolated policy information.

6. An apparatus comprising: means for receiving a communication message including at least one policy attribute; and means for inserting a policy attribute into the communication message in a predetermined sequence, the communication message comprising a Border Gateway Protocol (BGP) packet, and the policy attributes comprising BGP communities attributes, the means for inserting a policy attribute into the communication message in a predetermined sequence comprising: means for appending the policy attribute to at least one existing policy attribute in the communication message.

7. The apparatus of claim 6, wherein each BGP communities attribute comprises: an autonomous system identifier; and an attribute value.

8. An apparatus comprising: means for receiving a communication message including a plurality of policy attributes inserted in the communication message in a predetermined sequence; means for extrapolating policy information from the sequence of policy attributes, the means for extrapolating policy information considers an order of policy attributes in the predetermined sequence; and means for making routing decisions based upon the extrapolated policy information the communication message comprising a Border Gateway Protocol (BGP) packet, and the policy attributes comprising BGP communities attributes.

9. The apparatus of claim 8, wherein each BGP communities attribute comprises: an autonomous system identifier; and an attribute value.

10. The apparatus of claim 8, wherein the means for extrapolating policy information from the sequence of policy attributes comprises: means for formulating a policy decision based upon a plurality of policy attributes.

11. The apparatus of claim 8, wherein the means for making routing decisions based upon the extrapolated policy information comprises: means for determining a route based upon the extrapolated policy information.

12. A system comprising a plurality of communication devices, the plurality of communication devices including a number of communication devices each having means for inserting a policy attribute into a communication message in a predetermined sequence, and a receiving device including means for extrapolating policy information from the sequence of policy attributes provided by the number of communication devices in the predetermined sequence, and considering an order of the predetermined sequence for making intelligent routing decisions, the communication message comprising a Border Gateway Protocol (BGP) packet, and the policy attributes comprising BGP communities attributes.

13. The system of claim 12, wherein each BGP communities attribute comprises: an autonomous system identifier; and an attribute value.

* * * * *